No. 636,241. Patented Nov. 7, 1899.
C. A. BROWN.
METHOD OF AND MEANS FOR CONTROLLING SYSTEMS OF DISTRIBUTION.
(Application filed Mar. 22, 1897.)
(No Model.)
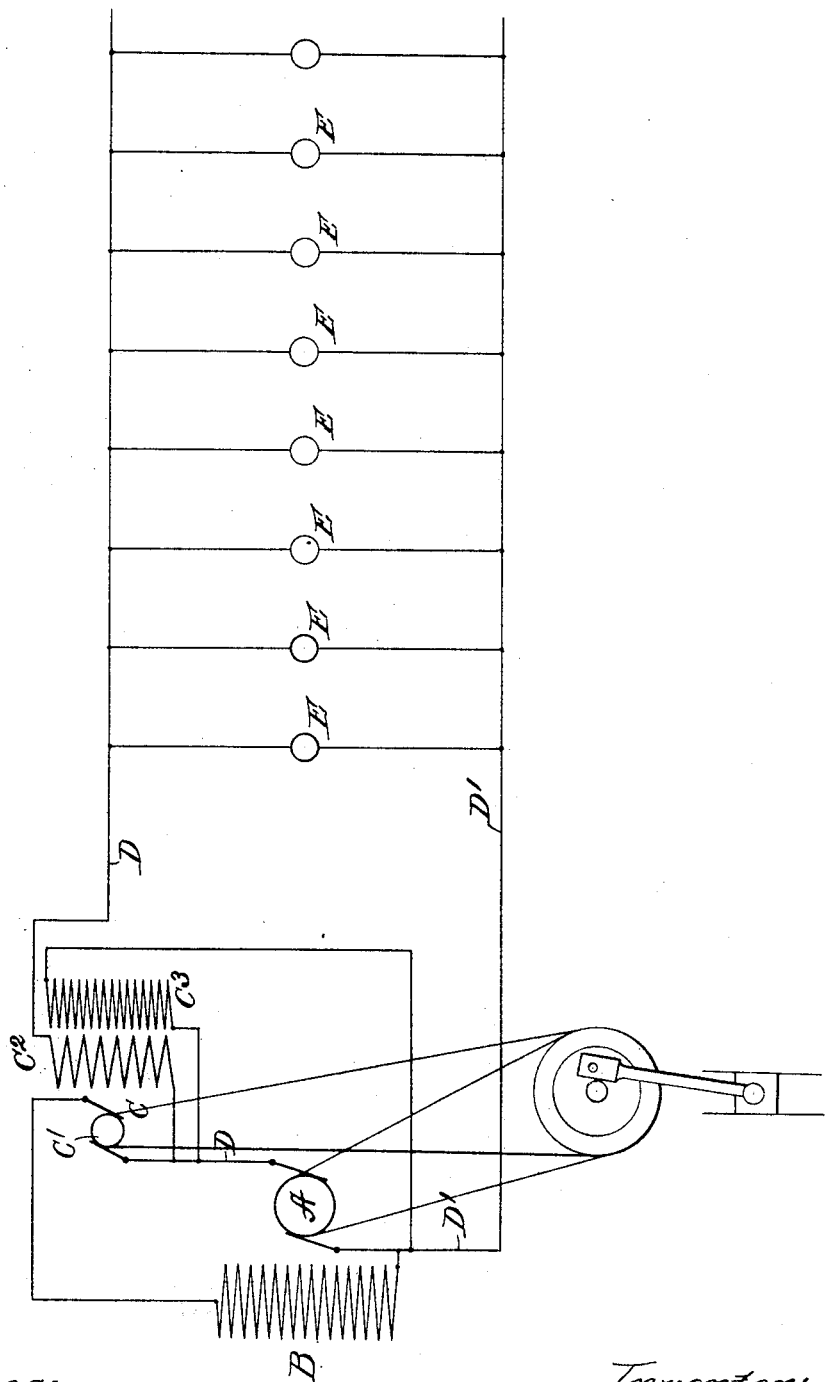
Witnesses:-
Inventor:
Charles A. Brown

UNITED STATES PATENT OFFICE.

CHARLES A. BROWN, OF CHICAGO, ILLINOIS, ASSIGNOR TO THE WESTERN ELECTRIC COMPANY, OF SAME PLACE.

METHOD OF AND MEANS FOR CONTROLLING SYSTEMS OF DISTRIBUTION.

SPECIFICATION forming part of Letters Patent No. 636,241, dated November 7, 1899.

Application filed March 22, 1897. Serial No. 628,555. (No model.)

*To all whom it may concern:*

Be it known that I, CHARLES A. BROWN, a citizen of the United States, residing at Chicago, in the county of Cook and State of Illinois, have invented a certain new and useful Improvement in Methods of and Means for Controlling Systems of Electrical Distribution, (Case No. 4,) of which the following is a full, clear, concise, and exact description, reference being had to the accompanying drawing, forming a part of this specification.

My invention relates to a method of and means for controlling systems of electrical distribution, and has for its object the accomplishment of such control more readily, efficiently, and without the waste involved in similar combinations or systems previously employed in the art.

My system, speaking more particularly, contemplates the control of the generative force of a dynamo-electric machine serving as the main generator of a system of distribution by means of interposing a variable-current-controlling factor in the field-circuit of said generator which is governed by the resultant magnetism produced by helices connected in series and in multiple with the said system.

Multiple-arc systems of electrical distribution have previously been regulated by means of an interposed counter electromotive force in the field-circuit of the dynamo. The means for accomplishing this may be described as consisting of a main shunt-wound generator with a motor of similar type connected in its field-circuit, the said motor being adapted to interpose a variable counter electromotive force in the main field-circuit by means of an electro-magnetic brake which acts upon the armature-shaft of the motor and controls its rate of rotation. This method of regulating the flow of current through the field-coils of the main generator necessarily involves considerable waste of energy and requires additional apparatus for operating the brake device, both of which objections are avoided in the apparatus herein shown and described.

The system illustrated in the accompanying drawing, exemplifying one means for effecting the control of the output of the main dynamo, may be briefly described as consisting of a shunt-wound dynamo-electric machine supplying current to a multiple-arc system of lighting. Connected with the field-windings of the said main dynamo is a secondary dynamo-electric machine having compound field-windings, one of which is connected in a branch across the mains of the working circuit, and the other is connected in series with said circuit. By this arrangement of circuits and apparatus the strength of the fields of the main generator is controlled directly by the counter electromotive force exerted by the secondary dynamo and indirectly, but ultimately, by the resultant field produced in the secondary dynamo by the combined effects of the compound windings as thus connected with the circuit. The field-windings of the secondary are capable of various proportionate arrangements, as is well known in the art, whereby the resultant magnetic field produced in said dynamo under differing conditions of the working circuit will automatically maintain the requisite counter electromotive force in the field-circuit of the main generator.

My invention further contemplates the automatic transfer of energy to and from the field-circuit of the main dynamo to suit the conditions of the working circuits, which will be set forth later.

I will now describe my invention more particularly by reference to the accompanying drawing, which diagrammatically illustrates means for practicing the same.

The main generator A is provided with field-winding B, connected in shunt with the working circuit. The armature C' of a secondary dynamo-electric machine C is connected in series with the field-winding B, the said armature being adapted to supply the resistance in the main field-circuit of dynamo A. The secondary dynamo is provided with the compound field-windings $C^2$ and $C^3$, which are respectively connected in series with the working circuit of the main generator and in a branch across the mains thereof. From the brushes of dynamo A the mains D D' conduct the current to the lamps or translating devices E, connected in multiple arc between the said mains.

It is apparent with the above arrangement of circuits that the winding $C^2$ will receive less current, thereby weakening its influence upon the field, as more translating devices E are thrown out of circuit, while, on the contrary, winding $C^3$ being connected directly between the mains will build up the strength of the field of dynamo C under the same conditions, and in consequence the rate of rotation of its armature will tend to increase, which serves to introduce a corresponding increase of counter electromotive force into the field-circuit of dynamo A and reduces the flow of current therethrough.

I preferably wind the field-coils $C^2$ $C^3$ of the secondary dynamo-electric machine differentially, properly proportioning them to secure the result desired and meet the varying conditions of different circuits, and will describe them as thus arranged in the system shown, although I do not desire to be understood as limiting my invention to this arrangement of the compound windings in dynamo C. The said windings being differential, immediately more translating devices are cut into circuit winding $C^2$ will receive more current, while winding $C^3$ will receive proportionally less. This weakens the field of dynamo C, resulting in a corresponding reduction in the counter electromotive force exerted by its armature, which permits more current to flow through the winding B and rapidly builds up the field of the main dynamo. Conversely, should less current be demanded by the working circuit the influence of the winding is correspondingly weakened, the counter electromotive force of C rapidly increases, and the flow of current through the field-coils B of the main dynamo is reduced, thus automatically adjusting the generation of electromotive force to the requirements of the circuit and supplying at all times to each of the translating devices then connected in circuit a constant amount of current.

Having now detailed the electrical connections of the present system, I will consider a further feature of my invention, which contemplates the transference to the main circuit of energy developed by the secondary dynamo, and consists in connecting the two dynamos A and C with driving mechanism whereby the armatures are rotated at rates of speed substantially constant. Preferably both dynamos of the system are driven by a single source of power at predetermined speeds, and as a result of this mechanical arrangement of the plant the secondary dynamo C will during a portion of the time supply current to the circuit, while at other times it will operate as a motor and restore to the driving mechanism a portion of the energy received in the form of excessive current by the main field-circuit. Thus when a number of translating devices are cut out of the main circuit the resulting decrease in the current flowing therein will, by reason of the differential windings of the secondary dynamo C, increase the magnetic field strength of the latter, so that its armature will tend to rotate faster, and since the two machines A and C are mechanically coupled to rotate at relatively constant speeds the main generator A will thus receive back in the form of mechanical energy the excess of energy which it delivers electrically to the secondary dynamo C. When translating devices are being cut into the main circuit, on the contrary, the field strength of the secondary dynamo C will be reduced, its counter electromotive force will be overcome, and the secondary dynamo will be driven as a generator by the common source of power, supplying electrical energy for the field-circuit of the main generator A.

By means of the overcompounding effect obtainable in a system operated as above I am enabled to secure automatic compensation for the necessary drop in potential in the mains, do away with any brake device, and effect a saving of energy otherwise consumed in the regulation of the system.

To those skilled in the art it will be seen that the method employed in the above-described system to effect the regulation of current and an economy in its operation is applicable to other apparatus, and I do not desire to be understood as limiting myself to a system such as the one shown, which serves merely to exemplify my invention. Various modifications of the above I accordingly consider within the spirit of my said invention.

Having thus described specific means for practicing my invention, what I claim as new, and desire to secure by Letters Patent, is—

1. The method of controlling the current-generative power of a dynamo-electric machine, which consists in supplying the field-circuit of such machine with electrical energy derived from the main circuit thereof, interposing in such derived field-circuit an armature exerting a variable electromotive force adapted to alter the flow of current through said field-circuit and effecting the alteration of the value of said current by means of the resultant magnetic influence of currents flowing in series and in parallel with the controlled circuit of said dynamo-electric machine, substantially as described.

2. The herein-described method of controlling the generative force of a dynamo-electric machine, which consists in shunting a portion of the current from said machine through the derived field-circuit thereof, interposing a variable counter electromotive force in such derived field-circuit and altering said counter electromotive force by means of the resultant effect of currents flowing in series and in parallel with the main or controlled circuit, substantially as described.

3. The method of controlling the generation of current which consists in interposing in the field-circuit of the generator, a variable factor controlling the magnetic field of said generator, altering said factor to suit the condition of the working circuit of said generator, and transferring to other portions of the system the excess of energy diverted to the field-circuit of the generator, substantially as described.

4. The herein-described method of operating a system of electrical distribution, which consists in interposing a variable counter electromotive force in the field-circuit of the main generator, altering said counter electromotive force by means of the resultant effect of currents flowing in series and in parallel with the controlled circuit, and diverting any excess of energy from the field-circuit of said generator to the main circuit thereof.

5. In a system of electrical distribution, the combination with a dynamo-electric machine having a field-circuit in shunt with and deriving current from the main circuit of the machine, of a device connected therewith exerting a variable electromotive force adapted to respond to changes in the current flowing in the main circuit, and means, controlled by the electromotive force of said device, for varying the electromotive force of said dynamo corresponding to variations of the current flowing in the main circuit, substantially as described.

6. The combination with a dynamo-electric machine having a field-circuit in shunt with and deriving energy from the main circuit thereof, of a secondary dynamo-electric machine included in the field-circuit of said first-mentioned dynamo adapted without change of speed to vary the current flowing in said field-circuit, whereby the current furnished to each translating device is maintained substantially constant, substantially as described.

7. The combination with a dynamo-electric machine having a field-circuit in shunt with, and deriving energy from, the main circuit thereof, of another dynamo included in said shunted field-circuit, adapted to vary the current flowing in said field-circuit and means for transmitting to the main circuit the excess of energy diverted to the field-circuit of the first-mentioned dynamo, substantially as described.

8. In a multiple-arc system of electrical distribution, the combination with a main dynamo-electric machine or generator for supplying current thereto, of a secondary dynamo-electric machine connected in the field-circuit of the main generator, compound windings provided for the secondary dynamo-electric machine connected respectively in series with and in a branch across the mains of the system adapted to alter the counter electromotive force of the said secondary dynamo, and a field-circuit for the main generator in shunt with the main or work circuit and including the armature of said secondary dynamo, whereby the field strength of the main dynamo is regulated to compensate for variations of load, substantially as described.

9. In a multiple-arc system, of electrical distribution, the combination with a main dynamo-electric machine adapted to supply current thereto, of a second dynamo-electric machine connected in the field-circuit of the main generator, compound field-windings provided for the second dynamo-electric machine connected respectively in series with and in a branch across the mains of the system, and means for transferring to other positions of the said system the excess of energy diverted to the field-circuit of the main generator, substantially as described.

10. The combination with a dynamo-electric machine A, of a field-circuit for said main dynamo in shunt with the main or work circuit thereof, a secondary dynamo C included in said shunt field-circuit, distributing-mains connected with the dynamo A, and compound field-windings for dynamo C, the said field-windings being connected respectively in series with said distributing-mains and in a bridge across the same, whereby the dynamo C is adapted to vary the current flowing in the field-circuit of dynamo A to compensate for variations of load in the main circuit, substantially as described.

11. In a system of electrical distribution, the combination with a main dynamo-electric machine A, of mains D D' connected therewith, a field-winding B for said dynamo connected in shunt with the mains, a secondary dynamo C, the armature whereof is included in the shunt-circuit which supplies the field-winding B, and differential field-windings $C^2$ $C^3$ for the secondary dynamo connected respectively in series and in parallel with the said mains, substantially as and for the purpose set forth.

12. In a system of electrical distribution, the combination with a main dynamo-electric machine A, of mains D D' connected therewith, a field-circuit for said main dynamo connected in shunt with said mains, a secondary dynamo C, the armature whereof is included in circuit with the said shunt field-winding of the main dynamo, differential field-windings $C^2$ $C^3$ for the said secondary dynamo, connected respectively in series and in parallel with the mains D D', and a mechanical connection between the dynamos A and C, substantially as and for the purpose set forth.

In witness whereof I hereunto subscribe my name this 11th day of March, A. D. 1897.

CHARLES A. BROWN.

Witnesses:
GEORGE L. CRAGG,
A. L. LAWRENCE.